United States Patent Office 3,551,433
Patented Dec. 29, 1970

3,551,433
PREPARATION OF 4-PHENYL-4-
ACYLOXYPIPERIDINE
Wililam R. Hydro, Bel Air, Md., and Richard J. Sundberg,
Charlottesville, Va., assignors to the United States of
America as represented by the Secretary of the Army
No Drawing. Filed June 21, 1967, Ser. No. 648,546
Int. Cl. C07d 29/24
U.S. Cl. 260—294.3         7 Claims

ABSTRACT OF THE DISCLOSURE

The method of preparing 4-phenyl-4-acyloxypiperidine comprising: the steps of reacting 4-phenyl-4-piperidinol with an amino protecting group to selectively inhibit the further reaction of the N-bond in piperidinol. The blocked piperidinol is acylated with an isopropenyl ester and subsequent hydrogenation cleaves the protecting group from the N-bond on the piperidine and restoring the original N—H bond of piperidine.

The new compound having the following structure:

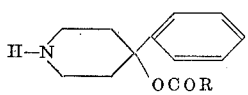

R is from 2 to 18 carbon atoms.

---

This invention relates to the new compound 4-phenyl-4-acyloxypiperidine and its method of prepaartion.

There have been several investigations described in the chemical literature of the attempts to prepare 4-phenyl-4-acyloxypiperidine. None of these studies were successful. This point will be more fully discussed below.

It is an object of the present invention to provide means for producing 4-phenyl-4-acyloxypiperidine.

A related object of the present invention is to utilize the new compound as an intermediate in preparing known analgesic compounds. One of its assets, in addition to being prepared for the first time, is that it opens a new route to synthesis more specifically having the advantage of requiring only a few steps as compared with the prior art synthesis.

In general, the present invention can be represented by the following scheme:

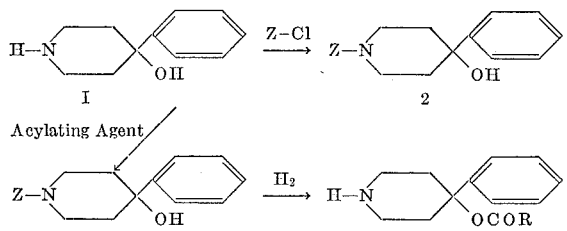

R is from 2 to 18 carbon atoms.

In the above formula, Z is any one of the members of the group of protecting agents, i.e. benzyloxycarbonyl, and the acylating agent is an isopropyl ester. The proportion of the protecting agent may be from about 2–6 parts to 1 part of the piperidinol derivative, Formula 1, and 1.5 to 3.0 parts of the acylating agent to 1 part of the protected piperidinol derivative, Formula 2.

Boggiano et al., J. Chem. Soc., 1143 (1959), discuss their unsuccessful attempts to prepare 4-phenyl-4-propionoxypiperidine on page 1145 as an intermediate for further condensation with 3-aryloxy-1,2-epoxypropane. Acylation of 4-phenyl-4-hydroxypiperidine with acetic or propionic anhydride at 100° C. did not produce any change at all and, in addition, utilizing stronger acylating conditions resulted in the formation of 1-acetyl and 1-propionyl-1,2,3,6 tetrahydro-4-phenylpyridine, respectively. The debenzylation of 1-benzyl-4-phenyl-4-propionoxypiperidine by hydrogenation resulted in a mixture of products none of which was the desired 4-phenyl-4-propionoxy-piperidine. In an effort to find a group more readily removable than the benzyl group, the diphenylmethylbromide was condensed with 4-phenyl-4-hydroxypiperidine, but only 1-diphenylmethyl-1,2,3,6-tetrahydro-4-phenylpyridine was obtained. Another unsuccessful approach was attempted by reacting sodium propionate and 4-bromo-4-phenylpiperidine, but this route also proved fruitless since upon dehydrohalogenation there was also concomitant N-acylation forming 4-phenyl-4-hydroxy - 1 - propionylpiperidine. The condensation of 2-diphenylmethoxy - 3 - phenoxypropylhalide (chloride, bromide) with 4-phenyl-4-hydroxypiperidine in the presence of p-toluene sulfonic acid as catalyst yielded the expected intermediate but resisted propionylation.

Mayor et al., J. Org. Chem. 26, p. 1867 (1961), in reacting 1-alkoxy - 4 - phenyl - 4 - hydroxypiperidine or its 3-methyl homologue with propionic anhydride did not obtain the desired acylation of the four position, but the elimination of the 1-alkoxy group and formation of the N-acylated piperidine. Lee and coworkers, discussed by Mayor et al., supra, prepared the corresponding propionates by prolonged heating of 1-methyl-4-phenyl-4-hydroxypiperidine with propionic anhydride. See also the Scheme A, p. 1867, the Formulae XI and XIII wherein the N-alkoxy group is disclosed but never the N—H bond as found in piperidine. In view of the similarities between the N-alkyl group in the prodine series of compound and the unalkylated N piperidine or our compound, it must be borne in mind that no one has ever produced the 4-phenyl-4-propionoxypiperidine as evidenced by the publication of Boggiano et al. and Mayor et al., supra.

In view of the unsatisfactory results of Boggiano et al. and Mayor et al., supra, in preparing the 4-phenyl-4-acyloxypiperidine, an investigation was instituted to prepare the said piperidine. We have discovered a method for synthesis of this heretofore unobtainable piperidine. The principal route of our invention involves the masking of N—H bond of piperidine, subsequent acylation, and quantitative removal of the masking group whereby regenerating the N—H bond of piperidine.

The use of certain moieties is often necessary to protect certain positions of the molecules from undergoing a chemical reaction while another portion of the molecule goes forward with the desired reaction. The protecting groups are so chosen as to convert the particular radical into a masked derivative and allow its quantitative removal under conditions whereby the original radical may be regenerated. The protecting effect of various groups that can be utilized according to our invention may be benzyloxycarbonyl-, t-butyloxycarbonyl-, p-toluene sulfonyl-(tosyl-), phthaloyl-, p-nitrobenzyloxycarbonyl-, p-phenylazobenzyloxycarbonyl-, cyclopentyloxycarbonyl-, triphenylmethyl-(trityl-), formyl-, trifluoroacetyl-, p-chlorobenzyloxycarbonyl-, p-(p' - methoxyphenylazobenzyloxycarbonyl-, and 1-adamantyloxycarbonyl-.

Without being limited thereby, the invention will be described with reference to the following procedure:

EXAMPLE 1

(A) Preparation of 1-benzyloxycarbonyl-4-phenyl-4-piperidinol

A solution of 4-phenyl-4-piperidinol (15.0 g.) in a mixture of water (270 ml.) and dioxane (150 ml.) was cooled in an ice-bath. Potassium hydroxide (60.0 g.) in water (75 ml.) and a separate portion of benzyl chloroformate (75 g.) were added respectively and alternatively in five (5) equal portions over a time period of 45 minutes to the above chilled solution of said piperidinol, water and dioxane. Vigorous shaking and cooling were always maintained during the addition of the above hydroxide and benzyl chloroformate. The reaction mixture was permitted to remain at room temperature for 30 minutes and was subsequently acidified with dilute hydrochloric acid and then extracted with benzene (100 ml.). The organic layer was separated and washed successively with dilute hydrochloric acid, dilute sodium carbonate, and brine. The organic layer was dried over magnesium sulfate and upon distillation of the benzene yielded an oily product which crystallized slowly upon standing. Recrystallization from a mixture of a carbon tetrachloride and hexane gave 20.8 g. (0.067 mole, 79%) of a cream-colored solid, M.P. 83–85° C., of 1-benzyloxycarbonylphenyl-4-piperidinol ($C_{19}H_{21}NO_3$) being confirmed by both the infrared and nuclear resonance spectra.

Analysis.—Calcd. for $C_{19}H_{21}NO_3$ (percent): C, 73.29; H, 6.80; N, 4.50; O, 15.41. Found (percent): C, 73.2; H, 6.9; N, 4.6; O, 15.4.

(B) Preparation of 1-benzyloxycarbonyl-4-phenyl-4-propionoxypiperidine

A mixture of 1-benzyloxycarbonyl-4-phenyl-4-piperidinol (5.70 g.), p-toluenesulfonic acid (30 mg.), and isopropenyl propionate (12 g.) was heated on a steam bath for one-and-three-quarter (1¾) hours under a nitrogen atmosphere for complete reaction. Benzene (50 ml.) was added to the reaction solution which was then washed with aqueous sodium carbonate, dried over magnesium sulfate and filtered. The solvent and other volatiles were removed under low and then under high vacuum. 1-benzyloxycarbonyl - 4-phenyl-4-propionoxypiperidine (6.9 g., 102%) was obtained as a clear, slightly yellow colored oil and was confirmed by both infrared and nuclear magnetic resonance spectra.

(C) Preparation of 4-phenyl-4-propionoxypiperidine

A solution of 1-benzyloxycarbonyl-4-phenyl-4-propionoxypiperidine (6.9 g.) and ethanol (30 ml.) was added to a stirring mixture of 1.5 g. of 5% palladium-on-carbon catalyst, concentrated hydrochloric acid (1.5 ml.) and ethanol (150 ml.) under a hydrogen atmosphere at near-atmospheric pressure. Hydrogenation was substantially complete in about 100 minutes; the catalyst was separated by filtration, and the filtrate was concentrated at room temperature in vacuo to a viscous syrup on a rotary evaporator. The viscous syrup was dissolved in acetone (100 ml.) and the volatiles were removed in vacuo to yield a white solid product (4.1 g., 85%), M.P. 174–176° C. Two recrystallizations from acetone-ethyl acetate-ether gave a needle product, 4-phenyl-4-propionoxy-piperidine (M.P. 174–176° C.), was confirmed by infrared spectrum.

EXAMPLE 2

(A) Preparation of 1-benzyloxycarbonyl-4-phenyl-4-acetoxypiperidine

A mixture of 1-benzyloxycarbonyl-4-phenyl-4-piperidinol (2.5 g.) (see Example 1 for preparation), p-toluenesulfonic acid (25 mg.) and isopropenyl acetate (8.0 g.) was heated for 3 hours on a steam bath forming a solution. Benzene was added to the said solution which was washed with sodium carbonate solution, dried over magnesium sulfate and the solvent was removed in vacuo to yield a viscous oil. Trituration of the said oil gave white crystals (2.7 g., 96%). Two recrystallizations from carbon tetrachloride-hexane gave white needles, M.P. 94–96° C. Infrared and nuclear magnetic resonance spectra confirmed the structure of 1-benzyloxycarbonyl-4-phenyl-4-acetoxy piperidine.

(B) Preparation of 4-phenyl-4-acetoxypiperidinium chloride

A solution of 1-benzyloxycarbonyl-4-phenyl-4-acetoxy-piperidine (0.537 g.) in acetic acid (2 ml.) and ethanol (10 ml.) was added to a stirring suspension of 0.10 gm. of 5% palladium in ethanol (15 ml.) under a hydrogen atmosphere at near-atmospheric pressure. The reaction was substantially complete in about 35 minutes. The hydrogenation reaction mixture was filtered and concentrated hydrochloric acid was added to the filtrate which was concentrated in vacuo at room temperature. The last remains of water and acetic acid were removed by several additions of 25 ml. portions of acetone and subsequent evaporation in vacuo. The residue from the evaporation was recrystallized from an acetone-ethanol-ether mixture and gave 4-phenyl-4-acetoxypiperidinium chloride, M.P. 208–210° C. in 29% (0.114 g.) yield. The structure of the product was confirmed by infrared and elemental analysis.

GENERAL SCHEME OF EXAMPLES 1 AND 2

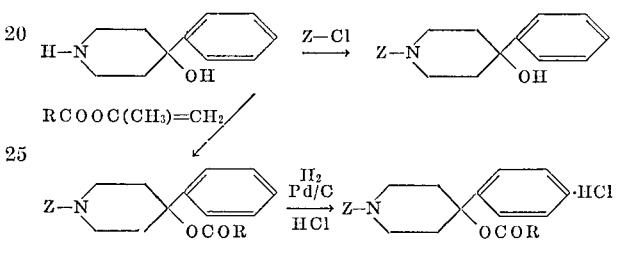

Z is selected from the group consisting of amino protecting group. R is from 2 to 18 carbon atoms.

Friedel-Crafts and related reactions are widely used in the acylation of aromatic compounds. Acylating agents which are commonly used are the acid chlorides or anhydrides, for example, propionyl chloride, and acetic and propionic anhydrides.

EXAMPLE 3

(A) A stirred mixture of 1 - benzyloxycarbonyl - 4-phenyl-4-piperidinol (1.0 g.), sodium carbonate (3.2 g.), water (0.5 ml.), and chloroform (20 ml.) was treated over a 15 minute period with a mixture comprising propionyl chloride (0.46 g.) and chloroform (10 ml.) at room temperature. There was no indication of propionylation.

(B) In another route to effect propionylation, a mixture of 1 - benzyloxycarbonyl - 4 - phenyl - 4 - piperidinol (1.0 g.), sodium carbonate (3.2 g.) and water (0.5 ml.) was stirred at room temperature with a solution of propionyl chloride (0.46 g.) in pyridine (0.4 ml.). There was no indication of any reaction. In order to confirm, the final reaction mixture was diluted with water (50 ml.) and chloroform (20 ml.). The chloroform extract separated and washed successively with dilute hydrochloric acid and 50% sodium carbonate solution. The said chloroform extract was dried over anhydrous magnesium sulfate and evaporated in vacuo giving 0.95 g. of a solid, M.P. 81–85° C. The nuclear magnetic resonance spectrum indicated not the desired 4-propionoxy derivative but to the contrary the unreacted starting material. Further investigations also demonstrated that the utilization of acid anhydride for acylation also proved to be fruitless. In view that the conventional acylating agents could not be incorporated in my method, experimentation was instituted to investigate other avenues for acylation. The surprising and unexpected result was that an ester as acylating agent could be utilized. The particular esters found to be effective are the broad class of isopropenyl esters wherein the carbon content of the ester moiety from fatty monocarboxylic acids containing from 2 to 18 carbon atoms. A method of producing these esters is disclosed in U.S. Pat. No. 2,646,437.

The use of the 4-phenyl-4-acyloxypiperidine now opens new simplified synthetic routes in preparing known pharmaceutical agents, having been shown to be powerful analgesics of the 1-substituted 4-phenyl-4-acyloxy piperidine series according to the following Examples 4–5.

EXAMPLE 4

A solution of phenyl vinyl ketone (0.1 g.), 4-phenyl-4-propionoxypiperidinium chloride (0.2 g.), and chloroform (5 ml.) was permitted to stand for 24 hours at room temperature. The solvent was subsequently removed at reduced pressure at ambient temperature. The product, 1-(2-benzoylethyl) - 4 - phenyl-4-propionoxypiperidinium chloride [(0.17 g.) (57%), M.P. 148–150°], was confirmed by infrared spectrum and mixed melting point determinations. The proportions of the said chloride may be from about 1–3 parts to 1 part of the said ketone.

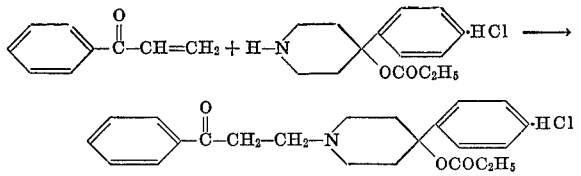

Carabateas et al., J. Med. Pharm. Chem., vol. 5 (1962), 913, set forth the prior art method of preparing 1-(2-benzoylethyl)-4-phenyl-4-propionoxypiperidines.

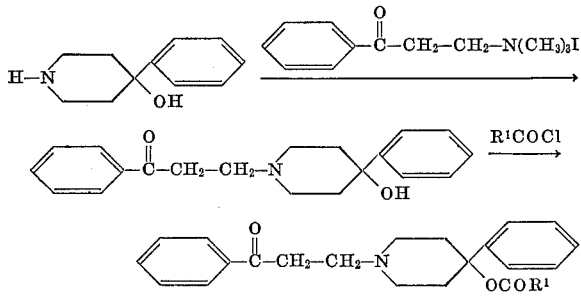

R′ is propyl.

EXAMPLE 5

A solution of 2-vinylpyridine (0.39 g.), 4-phenyl-4-propionoxypiperidinium chloride (1.0 g.) in chloroform (7 ml.) was permitted to stand for 24 hours at ambient temperature and then diluted with anhydrous ethyl ether to precipitate the product, or the chloroform can be removed without the addition of the ether and recover the product. The recrystallized product from acetone-ether had a M.P. 172–173° and a yield of 0.58 g. (41%). The infrared spectrum confirmed the proposed structure of 1[2-(2-pyridyl)ethyl]-4-phenyl-4-propionoxy piperidinium chloride. The proportions of the said chloride may be from about 1–4 parts to 1 part of the said pyridine.

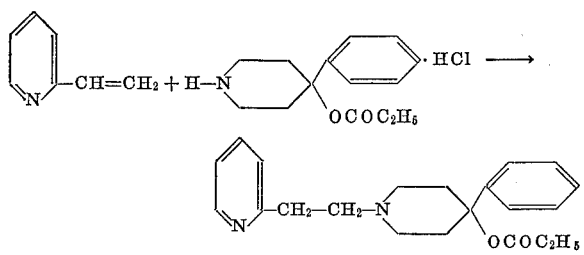

We claim:
1. The compound having the following structure:

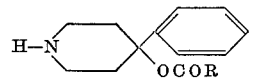

wherein R is an alkyl radical having 2 to 3 carbon atoms.

2. The compound according to claim 1 wherein R is propyl.

3. The compound according to claim 1 wherein R is ethyl.

4. Process for producing 4-phenyl-4-acyloxypiperidine comprising: the steps of reacting 4-phenyl-4-piperidinol with an amino protecting group to block the N-bond of piperidinol inhibiting the further reaction of N-atom, acylating the hydroxyl group of piperidinol with an isopropenyl ester having the following formula:

$$R'\ COOC(CH_3)=CH_2$$

where R′ is an alkyl group containing from two to eighteen carbon atoms, and hydrogenating the blocked acylated piperidine resulting in removing the said protecting group and restoring the original N—H bond of piperidine.

5. Process according to claim 4 wherein the protecting group is benzyloxycarbonyl, t-butyloxycarbonyl, or p-toluene sulfonyl.

6. Process according to claim 4 wherein R′ of the isopropenyl ester is propyl.

7. Process according to claim 4 wherein R′ of the isopropenyl ester is ethyl.

References Cited

Cram et al.: "Organic Chemistry," 2nd edition, McGraw-Hill Book Co., New York, N.Y. (1964), p. 323.
Profft: Chemiker-Zeitung 81, 427–30 (1957).
Boggiano et al.: J. Chem. Soc., 1143 (1959).

HENRY R. JILES, Primary Examiner
G. T. Todd, Assistant Examiner

U.S. Cl. X.R.
260—294.7